2,925,426

EPOXY ETHER ESTERS

Carl W. Schroeder, Orinda, Calif., assignor to Shell Development Company, New York, N.Y., a corporation of Delaware No Drawing. Application December 29, 1955
Serial No. 556,059

8 Claims. (Cl. 260—348)

This invention relates to a new class of epoxy-substituted organic compounds and to their preparation. More particularly, the invention relates to new epoxy ether esters, to their preparation from hydroxy-substituted carboxylic acids, and to their utilization, particularly as stabilizers and plasticizers and as monomers for the preparation of improved polymeric products.

Specifically, the invention provides new and particularly useful polyepoxy ether esters theoretically derived from hydroxy-substituted carboxylic acids by etherifying the OH group with an epoxy alcohol and esterifying the carboxyl group with an epoxy alcohol, the epoxy groups of the said alcohols remaining intact in the ether ester molecule. The invention further provides polymeric products obtained by polymerizing the above-described polyepoxy ether esters by themselves or with other types of epoxy-substituted compounds.

It is an object of the invention to provide a new class of epoxy-substituted organic compounds. It is a further object to provide new polyepoxy ether esters, and to a method for their preparation. It is a further object to provide new polyepoxy ether esters which are particularly useful and valuable in the chemical and related industries. It is a further object to provide new polyepoxy ether esters which are valuable as stabilizers and plasticizers for vinyl halide polymers. It is a further object to provide polyepoxy ether esters which are valuable as lubricants and crease- and shrink-proofing agents for textile fabrics. It is a further object to provide novel epoxy ether esters that may be polymerized to form polymers having valuable properties. Other objects and advantages of the invention will be apparent from the following detailed description thereof.

It has now been discovered that these and other objects may be accomplished in part by the novel compounds of the invention comprising polyepoxy ether esters which are theoretically derived from hydroxy-substituted carboxylic acids by etherifying the OH group with an epoxy alcohol and by esterifying the carboxyl group with an epoxy alcohol, the epoxy groups in the alcohols remaining intact in the ether ester molecule. It has been found that these particular polyepoxy compounds possess unobvious beneficial properties which make them particularly adapted for many industrial applications. The new compounds, for example, generally have lower viscosities or lower melting points than the commercially available glycidyl ethers and having better resistance to hydrolysis than the glycidyl esters. They are thus able to give superior performance when utilized as stabilizers for halogen-containing polymers, such as polymers of vinyl chloride. When added to such polymers they tend to act both as a plasticizing agent and a stabilizing agent. The above-described ether esters also act as lubricants and softening agents for textiles and when cured within the fibers of the fabrics tend to impart improved crease- and shrink-resistance to the fabric.

It has also been found that the above-described novel polyepoxy ether esters can be cured with acidic or alkaline materials to form cross-linked products which find many important applications. Their generally low viscosities make them particularly useful in applications, such as in the formation of coating compositions, adhesives, laminates, and the like, where a free-flowing resinous composition is desirable. In these and other applications they may be polymerized by themselves or in combination with other polyepoxy materials, such as the glycidyl ethers of polyhydric phenols and the like.

The new compounds of the invention comprise the epoxy ether esters of hydroxy carboxylic acids. The hydroxy carboxylic acids may be mono- or polyhydric and may be mono- or polycarboxylic and may be aliphatic, cycloaliphatic or aromatic. Examples of these acids include, among others, hydroxyacetic acid,
3-hydroxypropionic acid,
2-hydroxybutyric acid,
2-hydroxyvaleric acid,
alpha-hydroxylauric acid,
alpha-hydroxycaprylic acid,
alpha-hydroxystearic acid,
10-hydroxystearic acid,
8,10-dihydroxystearic acid,
8,10-dihydroxyeicosanedioic acid,
citric acid,
8,10-dihydroxyeicosanedioic acid, citric acid,
8-hydroxydodecanedioic acid,
8,10-dihydroxyoctadecanedioic acid,
alpha-hydroxymyristic acid,
2,3-dihydroxypropionic acid,
gamma,delta-dihydroxyvaleric acid,
hydroxymalonic acid,
hydroxysuccinic acid,
dihydroxysuccinic acid,
3-hydroxybenzoic acid,
3-hydroxyphthalic acid and the like.

Preferred acids include the hydroxy-substituted aliphatic mono- and dicarboxylic acids containing up to 20 carbon atoms and the hydroxy-substituted aromatic mono- and dicarboxylic acids containing up to 15 carbon atoms. Especially preferred are the hydroxy-substituted long-chain fatty acids containing from 10 to 20 carbon atoms, such as the hydroxy-substituted stearic acids and the like.

The epoxy alcohol portion of the ether esters are derived from aliphatic or cycloaliphatic monohydric alcohols possessing at least one epoxy group, i.e., a

group. These alcohols may be aliphatic, cycloaliphatic, aromatic or heterocyclic and may be saturated or unsaturated and substituted with non-interfering substituents, such as halogen atoms. Examples of these alcohols include 2,3-epoxypropanol (glycidol),
3,4-epoxybutanol,
2,3-epoxybutanol,
2,3-epoxyhexanol,
epoxidized octadecadienol,
epoxidized dodecadienol,
epoxidized tetradecadienol,
3,4-epoxydihydropyran-5-propanol,
2,3-dimethyl-4,5-epoxyoctanol,
2-methoxy-4,5-epoxyoctanol,
3,4-epoxy-5-chlorocyclohexanol,
2,3-epoxy-propoxypropanol,
2,3-epoxy-propoxyhexanol, 2,3-epoxypropoxyoctanol,
2,3-epoxypropoxy-2,3-dihydroxyheptanol,
2,3-epoxydodecanol, and
4-chloro-5,6-epoxydodecanol.

Preferred epoxy-substituted alcohols are the epoxy-substituted aliphatic and cycloaliphatic monohydric alcohols containing from 3 to 15 carbon atoms, such as 2,3-epoxypropanol, 3,4-epoxybutanol, 3,4-epoxydodecanol, 2-methyl-2,3-epoxypropanol, 2,3-epoxycyclohexanol, 2,3-epoxypropoxyethanol, and 2,3-epoxypropoxyoctanol.

Particularly preferred epoxy-substituted alcohols are the epoxyalkanols, epoxyalkoxyalkanol, epoxyalkenols, epoxyalkoxyalkenols, epoxycycloalkanols and epoxyalkoxyalkanols, epoxycycloalkenols and epoxyalkoxyalkenols, and particularly those containing no more than 12 carbon atoms, such as 2,3-epoxypropanol, 3,4-epoxyhexanol, 2,3-epoxypropoxyoctanol, 2,3-epoxy-5-octanol, 2,3-epoxy-6-dodecanol, 2,3-epoxypropoxy-5-octenol, and the like.

Of special interest are the monoepoxy-substituted alkanols containing from 3 to 8 carbon atoms and the monoepoxy-substituted alkoxyalkanols containing not more than 10 carbon atoms. The 2,3-epoxy alkanols are particularly preferred.

The novel polyepoxy ether esters of the invention are those theoretically derived by the etherification of a hydroxyl group of one of the above-described hydroxyl-containing carboxylic acids and by the esterfication of a carboxyl group of these acids with any one or more of the above-described epoxy-substituted monohydric alcohols. Eaxmples of such polyepoxy ether esters include, among others, 2,3-epoxypropyl 2,3-epoxypropoxyacetate,
2,3-epoxypropyl 9-(2,3-epoxypropoxy) stearate,
2,3-epoxypropyl 9,10-bis(2,3-epoxypropoxy) stearate,
epoxypropoxypropyl epoxypropoxyacetate,
di(2,3-epoxypropyl) 3-epoxypropoxy-pentanedioate,
tri(2,3-epoxypropyl) 3-epoxypropoxy-1,4,8-octanetrioate,
epoxypropoxyethyl 9-(2,3-epoxypropoxy) stearate,
2,3-epoxypropyl 3-epoxypropoxy-benzoate,
di(2,3-epoxypropoyl) 3-epoxypropoxy-1,2-cyclohexanedicarboxylate,
di(2,3 - epoxypropyl) 3 - epoxypropoxy - 1,2 - benzene-dicarboxylate,
3,4-epoxybutyl 2-(2,3-epoxypropoxy) butyrate
and the like.

Particularly preferred ether esters are those theoretically derived from the 2,3-epoxyalkanols and 2,3-epoxyalkoxyalkanols and the preferred hydroxy-substituted aliphatic acids and aromatic acids, such as, for example, 2-3-epoxypropyl acetate,
2,3-epoxypropyl 9,10-bis(epoxypropoxy) stearate,
2,3-epoxypropyl epoxypropoxybenzoate,
di(2,3-epoxypropyl) 3-epoxypropoxy-1,2-cyclohexanecarboxylate and
di(2,3 - epoxypropyl) 3 - epoxypropoxy - 1,2 - benzene-dicarboxylate.

Coming under special consideration are the esters of the formulae

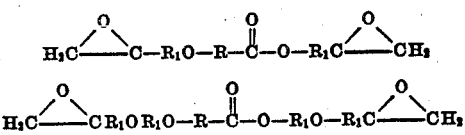

wherein R is an aliphatic or aromatic hydrocarbon containing not more than 18 carbon atoms and R₁ is an alkylene radical containing up to 8 carbon atoms.

The novel polyepoxy ether esters may be prepared by a variety of methods. They may be prepared, for example, by reacting the hydroxy-substituted carboxylic acid with an epoxy-forming material of the group consisting of halo-substituted alkanes and dihalo-hydroxy-substituted alkanes, in the presence of a catalyst, such as an acid-acting catalyst, and then dehydrohalogenating the resulting product.

The expression "halo-epoxy-substituted alkanes" as used herein refers to those alkanes having a 1,2-epoxy group, i.e., a

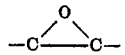

group attached directly to a halogen-bearing carbon atom, such as, for example, epichlorohydrin, epibromohydrin, 1,4-dichlor-2,3-epoxybutane, 1-chloro-2,3-epoxy-pentane, and the like. The expression "dihalo-hydroxy-substituted alkanes" as used herein refers to those alkanes having a series of three carbon atoms one of which is attached to a halogen atom, the next is attached to a hydroxyl group and the last is attached to a halogen atom, such, as, for example, 1,3-dichloro-2-hydroxypane, 2,4-dibromo-3-hydroxpentane, 2,3-dichloro-3-hydroxy-butane, and the like. Epichlorohydrin comes under special consideration because of its low cost and because of the superior properties of the epoxy ethers obtained therefrom.

The proportion of the hydroxy-substituted carboxylic acid and the epoxy-forming material used in preparing the new polyepoxides may vary over a considerable range. As the hydroxyl group is to be etherified and the carboxyl group esterified, one mole of the hydroxy-substituted carboxylic acid should be reacted with at least two moles of the epoxy-forming material and with an additional mole for every additional functional group on the acid molecule, such as an additional carboxyl group, which might interfere with the desired etherification and esterification. Monohydroxy-substituted monocarboxylic acids should, for example, be reacted with at least two moles of the epoxy-forming material, while the monohydroxy-substituted dicarboxylic acids should be reacted with at least three moles of the epoxy-forming materials.

The reaction between the hydroxy-substituted carboxylic acid and the epoxy-forming material is effected in the presence of a condensation catalyst, such as acid-type catalyst including HF, H₂SO₄, H₃PO₄, salts such as SnCl₄ and BF₃ ether complexes. The concentration of the catalyst will vary depending upon the individual catalyst. In general, the catalysts are employed in amounts varying from about .1% to about 5% by weight of the reactants. The more active catalysts, such as the BF₃ complexes, are preferably employed in amounts varying from about .1% to about 1% while the less active catalysts, such as SnCl₄, are preferably used in amounts varying from about .5% to about 4%, as indicated in U.S. 2,260,753 and U.S. 2,380,185.

The condensation may be effected in the presence or absence of solvents or diluents. In most cases, it is preferred to employ a solvent, such as cyclohexane, benzene, tetrahydrofuran, and the like.

Temperatures generally range from about 25° C. to 150° C. and more preferably between 50° C. and 120° C. In general, the higher temperatures give darker products and are less preferred than the lower temperatures.

The condensation may be carried out in a variety of ways. The two reactants may be mixed at room temperature and the catalyst then added, or the catalyst may be added to one reactant and the other reactant added to that mixture.

The chlorohydrin product obtained by the above reaction is then treated with an alkaline material to dehydrohalogenate the product. This treatment may be accomplished by adding the alkaline material to the reaction mixture obtained in the above-described process, or the condensation product may be recovered from the reaction mixture by any suitable means, such as distillation, extraction, and the like, before it is combined with the alkaline material. Any of the known dehydrohalogenating materials may be used in this reaction, such as sodium and potassium hydroxide, sodium and potassium carbonates and bicarbonates, borax, hydroxides or magnesium, zinc, lead, iron and aluminum, and the corresponding oxides, etc. The aluminates, silicates and zincates of alkali salts, such as sodium and potassium aluminate and sodium and potassium zincate, are particularly good dehydrohalogenating agents when used in substantially, or completely, nonaqueous media.

The amount of the dehydrohalogenating agent used will vary depending on the number of groups to be dehydrohalogenated. At least one mole of the agent should be employed for every halohydrin group to be converted to an epoxy group. Thus, if all of the halohydrin groups on the condensation product of epichlorohydrin and 3-hydroxy-1,4-butanedioate

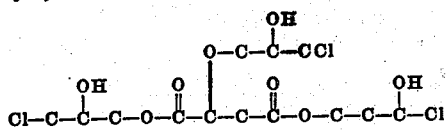

are to be converted to epoxy groups, the above product should be reacted with approximately 3 moles of the alkaline material.

In most cases, the dehydrochlorinating agent may be applied to the halohydrin as an aqueous solution or suspension or dissolved in an inert solvent, such as ethers, esters, hydrocarbons, and the like. If the above-noted aluminates, silicates or zincates are used as the alkaline material, the dehydrohalogenation is preferably effected in a non-aqueous medium and the salts as by themselves or dissolved in organic solvents or diluents. Carbon tetrachloride, 1,4-dioxane and dichloroethyl ether are particularly satisfactory as solvents for this purpose.

The novel polyepoxy ether esters may also be prepared by epoxidizing the corresponding unsaturated ether ester. Thus, 2,3-epoxypropyl epoxypropoxy acetate may be prepared by epoxidation of allyl allyloxyacetate.

The epoxidation of the unsaturated compounds may be advantageously carried out by reacting the unsaturated compound with an epoxidizing agent. Organic peracids, such as peracetic acid, perbenzoic acid, monoperphthalic acid and the like, are preferred agents for this reaction.

The amount of the epoxidizing agent employed will vary over a considerable range depending upon the type of product desired. In general, one should employ at least one mole of the oxidizing agent, such as perbenzoic acid, for every ethylenic group to be epoxidized. Thus, to produce epoxypropyl epoxypropoxypropionate, one should react one mole of allyl allyloxypropionate acid with approximately two moles of the perbenzoic acid. In some cases, it is rather difficult to effect epoxidation of all of the ethylenic groups and if a completely epoxidized product is required, additional epoxidizing agent and/or longer reaction periods may be required.

It is preferred to carry out the epoxidation reaction in a suitable mutual solvent for the reactants and product. Chloroform is an especially useful solvent for the purpose, but other materials such as ethyl ether, dichloromethane, benzene, ethyl acetate, etc., and the like, may be used. It is not necessary to operate under anhydrous conditions but the amount of water present should be limited so as to avoid excessive hydrolysis of the epoxy groups. Up to 25% water in the reaction mixture may be tolerated.

The temperature employed during the epoxidation may vary over a considerable range depending upon the type of reactants and oxidizing agent selected. It is generally desirable to maintain the temperature between —20° C. to 60° C. and more preferably between 10° C. and 40° C. Atmospheric, superatmospheric or subatmospheric pressures may be employed as desired.

The epoxidized products obtained by this method may be recovered from the reaction mixture by any convenient means known to the art, such as distillation, extraction, fractional precipitation, filtration, and the like.

The novel ether esters of the invention are soluble in a great many oils and solvents and are compatible with many synthetic polymers and resin. The ether esters are particularly valuable as additives for vinyl polymers as they act to plasticize the polymer and form compositions having good flexibility and strength over a wide range of temperature.

The vinyl polymers that may be plasticized with the novel ether esters of the invention include the homopolymers, copolymers, and interpolymers of the vinyl-type monomer, i.e., those monomers having a $CH_2=C=$ group, such as styrene, alpha-methyl styrene, vinyl naphthalene, vinyl phenol, acrylic acid esters as methyl acrylate, propylacrylate, butyl acrylate, esters of substituted acrylic acid, such as methyl methacrylate, lauryl methacrylate, hexyl methacrylate, vinylidene chloride, vinyl chloride, acrylonitrile, methacrylonitrile, vinyl esters of vinyl acetate, vinyl benzoate, vinyl caproate, diallyl phthalate, diallyl succinate, vinyl ethers, such as vinyl ethyl ether, vinyl butyl ether, the vinyl ketones, vinyl pyridine, and the like.

Particularly preferred materials to be plasticized with the novel ether esters are the halogen-containing polymers and copolymers, and particularly the homopolymer of the vinyl halides and copolymers of the vinyl halides with dissimilar monomers as the unsaturated esters.

A single novel ether ester may be used as the plasticizer or a mixture of two or more of the compounds may be utilized. In addition, the esters may be used as plasticizers in combination with other plasticizing materials, such as dioctyl phthalate, dibutyl phthalate, tricresyl phosphate, dibutyl sebacate, and the like.

The amount of the ether esters to be incorporated with the above-described polymers may vary over a considerable range depending upon the particular type of polymer, intended use of the product, etc. In most cases, the amount of the plasticizer will vary from about 20 to 150 parts by weight per 100 parts by weight of resin. A more preferred range of plasticizer comprises 40 parts to 75 parts by weight for every 100 parts by weight of resins.

The polymer and ether ester may be compounded by means of conventional equipment such as mills of the heated roll-type of internal mixers. The plasticizer and other compounding ingredients, such as fillers and stabilizers, are worked into the vinyl resin so that they are thoroughly dispersed therein by means of such equipment, and the resultant composition then molded, calendered, extruded or otherwise formed into articles of the desired shape by conventional procedure.

The novel ether esters of the invention may also be used as stabilizing agents for halogen-containing polymers. The ether esters are easily compatible with these polymers and in combination therewith form compositions which have good resistance to discoloration by heat and/or light. The novel ether esters may be used as stabilizers by themselves or they may be used in combination with other stabilizing agents, such as urea and thiourea derivatives, metal salts or organic and inorganic acids, and the like.

In most cases, the ether esters are effective as stabilizers in amounts varying from about .1% to 5% by weight of the polymer being stabilized, but larger or smaller amounts may be employed as desired or necessary. If other stabilizers are employed in combination with the novel ether esters, the ether esters may generally be utilized in smaller quantities, such as from about .01% to about 2% by weight of the polymer.

The ether esters may be incorporated into the halogen-containing polymers by any suitable method. They may be added in a dissolved, suspended or pulverulent state to the desired polymer which, in turn, may be in a dissolved, dispersed or solid state. In some cases, it may be possible to introduce the ether esters in the reaction mixture during the formation of the halogen-containing polymer. In most cases, however, it will probably be more desirable to add the ether ester by merely mixing the polymer and ether ester in a masticator or on heated differential rolls.

As noted above, the novel ether esters also act as plasticizing materials for these halogen-containing polymers so with these polymers, it is possible to utilize the ether esters as stabilizer-plasticizers. In this case, they will be added in amounts and in the manner described hereinabove for their use as plasticizers and in that case the resulting composition will display the desired improvement in flexibility as well as increased resistance to heat and light.

The polyepoxides of the present invention are particularly useful in the preparation of valuable polymeric products. They may react with hydroxy containing materials, such as hydroxy containing polyesters, to form block copolymers, or they may be polymerized by themselves or with other types of epoxy-containing materials. Materials of this latter type that may be copolymerized with the claimed polyepoxides include, among others, ethylene oxide, propylene oxide, isobutylene epoxide, epichlorohydrin, vinyl cyclohexane dioxide, butadiene mono- or dioxide, epoxidized tri- and diglycerides, epoxy-ethers, such as diglycidyl ether and glycidyl ethers of polyhydric phenols obtained by reacting a polyhydric phenol, such as bis-phenol with an excess of a halogen-containing epoxide, such as epichlorohydrin, in an alkaline medium, polyepoxy polyethers obtained by reacting, preferably in the presence of an acid-acting compound, such as hydrofluoric acid, a halogen-containing epoxide, such as epichlorohydrin, with a polyhydric alcohol, such as glycerol, ethylene glycol, hexanetriol, sorbitol, mannitol, pentaerythritol, polyglycerol, and the like, and subsequently treating the resulting product with an alkaline component to replace the epoxy group, and other polyepoxide esters, such as di(2,3-epoxypropyl) adipate, and the like. The glycidyl polyethers of polyhydric phenols obtained by condensing polyhydric phenols with epichlorohydrin are also referred to as "ethoxyline" resins. See Chemical Week, vol. 69, page 27, for September 8, 1951.

The polymerization of the novel expoxy-substituted ether esters is preferably accomplished by heating the materials in the presence of an epoxy curing catalyst, such as an amine as triethylamine, ethylene-diamine, 2,4,6-tris(dimethylaminomethyl)phenol, melamine; acids and anyhydrides, such as pthalic anhydride, and $BF_3$ and its ether complexes. Amounts of catalyst employed preferably vary from .1% to 15% by weight of the monomer. Temperatures used for the polymerization generally vary from about 40° C. to about 100° C.

The polymers prepared from the novel epoxy ether esters by themselves or with other types of polyepoxide materials are useful in the preparation of coating and impregnating compositions, additives for lubricating oils as viscosity index improvers and pour point depressants, and in the formation of pottings and castings for electrical apparatus and in the formation of rigid plastic articles.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the preparation and some of the properties of 2,3-epoxypropyl epoxypropoxyacetate.

114 parts of hydroxyacetic acid and 138.5 parts of epichlorohydrin were combined and heated to 120° C. 138.5 parts of epichlorohydrin containing 0.4 part of $BF_3$-etherate was slowly added thereto and heating continued for several hours. The mixture was then cooled to 45° C. and 184 parts of $Na_4S_2O_4$ was added to the reaction mixture. The temperature was increased to 70° C. and then cooled with ice to about 50° C. The mixture was then filtered and distilled to yield a white colored liquid identified as 2,3-epoxypropyl epoxypropoxyacetate. Analysis: ester value 0.587 eq./100 g., acid value 0.005 eq./100 g.

The above epoxy ether ester is of value as a combined plasticizer for poly(vinyl chloride) and copolymers of vinyl chloride and vinyl acetate in loadings varying from 40 parts per 100 parts of polymer to 70 parts per 100 parts of polymer.

When 100 parts of the above-described epoxy ether ester is mixed with 5 parts of 2,4,6-tris(dimethylaminomethyl)phenol and the mixture heated at 65° C., the mixture sets up to form a hard tough casting.

*Example II*

This example illustrates the preparation and some of the properties of 2,3-epoxypropyl 3-epoxypropoxypropionate.

135 parts of 3-hydroxypropionic acid and 138.5 parts of epichlorohydrin are combined and heated to 120° C. 138.5 parts of epichlorohydrin containing 0.4 part of $BF_3$-etherate are slowly added thereto and heating continued for several hours. The mixture is then cooled and 184 parts of $Na_2S_2O_4$ added to the reaction mixture. The mixture was then heated to 80° C. for about 2 hours and then cooled. The mixture was filtered and distilled under vacuum to yield a liquid polyepoxide identified as 2,3-epoxypropyl 3-epoxypropionate

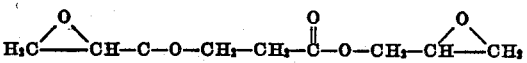

This epoxy ether ester may be used as a combined plasticizer-stabilizer for poly(vinyl chloride) at loading of 50 parts of the ether ester per 100 parts of the poly(vinyl chloride).

When 100 parts of the above polyepoxide is mixed with 100 parts of diglycidyl ether of bis-phenol and 5 parts of 2,4,6-tris(dimethylaminomethyl)phenol and the mixture heated at 65° C., the mixture sets up to form a hard tough casting.

Esters having related properties are obtained by replacing the 3-hydroxypropionic acid in the above-described process with equivalent amounts of each of the following: 4-hydroxybutyric acid, 3-hydroxypentanoic acid and 3-hydroxyhexanoic acid.

*Example III*

This example illustrates the preparation and some of the properties of 2,3-epoxypropyl 3-epoxypropoxyoenzoate.

189 parts of 3-hydroxybenzoic acid and 138.5 parts of epichlorohydrin are combined and heated to 150° C. 138.5 parts of epichlorohydrin containing 0.4 part of $BF_3$-etherate is slowly added thereto and heating continued for several hours. The mixture is then cooled and 184 parts of $Na_4S_2O_4$ added to the reaction mixture. The temperature is increased to 70° C. for several hours and then cooled to 50° C. The mixture is then filtered and distilled under vacuum to yield a liquid polyepoxide identified as 2,3-epoxypropyl 3-epoxypropoxybenzoate

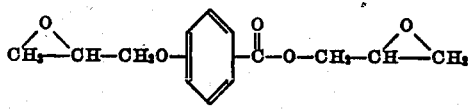

About 100 parts of the polyepoxide produced above is mixed with 50 parts of diglycidyl ether of bis-phenol and 5 parts of 2,4,6-tris(dimethylaminomethyl)phenol and the mixture heated at 65° C. After several hours, the mixture sets up to a hard tough casting.

*Example IV*

This example illustrates the preparation and some of the properties of bis(2,3-epoxypropyl) 2-(epoxypropoxy) 1,4-butanedioate.

201 parts of malic acid (hydroxysuccinic acid) and 138.5 parts of epichlorohydrin are combined and heated to 150° C. 277 parts of epichlorohydrin and 0.5 part of BF₃-etherate are slowly added thereto and heating continued for several hours. The mixture is then cooled and 276 parts of Na₄S₂O₄ added to the reaction mixture. The temperature is increased to 70° C. for several hours and the mixture is cooled. The mixture is then filtered and distilled under vacuum to yield a viscous liquid polyepoxide identified as bis(2,3-epoxypropyl) 2-(epoxypropoxy)-1,4-butanedioate.

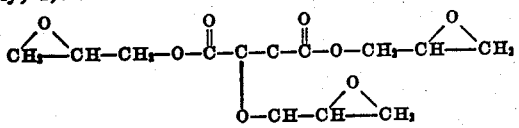

The above ester finds use as a combined plasticizer-stabilizer for poly(vinyl chloride) and copolymers of vinyl chloride and vinylidene chloride.

When 100 parts of the bis(2,3-epoxypropyl) 2-(epoxypropoxy)-1,4-butanedioate produced above is mixed with 5 parts of 2,4-6-tris(dimethylaminomethyl)phenol and the mixture heated at 65° C., the mixture sets up into a hard solid polymer.

Esters having related properties are obtained by replacing the malic acid in the above-described preparation process with equivalent amount of each of the following. 5-hydroxy-1,8-octanedioate and 4-hydroxyl-1,10-decanedioate.

Example V

This example illustrates the preparation and some of the properties of 2,3-epoxypropyl 10-(epoxypropoxy) stearate.

428 parts of 10-hydroxystearic acid and 138.5 parts of epichlorohydrin are combined with 200 parts of dioxane and heated to 100° C. 138.5 parts of epichlorohydrin and 0.4 part of BF₃-etherate are slowly added thereto and heating continued for two hours. The mixture is then cooled and 184 parts of Na₄S₂O₄ added to the reaction mixture. The temperature is increased to 70° C. for several hours and then cooled. The mixture is filtered and distilled under vacuum to yield 2,3-epoxypropyl 10-(epoxypropoxy) stearate

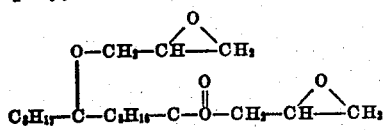

This ester finds use as a combined plasticizer-stabilizer for poly(vinyl chloride).

Example VI

This example illustrates the preparation and some of the properties of epoxypropoxyethyl epoxypropoxyacetate.

180 parts of ethylene glycol hydroxyacetate and 138.5 parts of epichlorohydrin are combined and heated to 150° C. 138.5 parts of epichlorohydrin and 0.4 part of BF₃-etherate are slowly added thereto and heating continued for several hours. The mixture is then cooled and 184 parts of Na₄S₂O₄ added to the reaction mixture. The temperature is increased to 70° C. for several hours and the mixture is cooled. The mixture is then filtered and distilled to yield a white liquid identified as epoxypropoxyethyl epoxypropoxyacetate

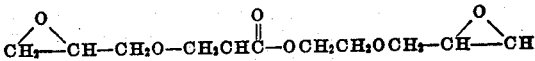

When 100 parts of the above polyepoxide is mixed with 5 parts of 2,4,6-tris(dimethylaminoethyl)phenol and the mixture heated at 65° C., the mixture sets up into a very hard solid polymer.

Epoxy ether esters having related properties are obtained by replacing the ethylene glycol hydroxyacetate in the above process with equivalent amounts of each of the following: hexamethylene glycol hydroxyacetate and pentamethylene glycol hydroxyacetate.

I claim as my invention:

1. A compound of the formula

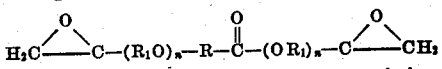

wherein R is chosen from the group consisting of an aliphatic hydrocarbon radical having not more than 18 carbon atoms and an aromatic hydrocarbon radical having not more than 18 carbon atoms, $R_1$ is an alkylene hydrocarbon radical having not more than 8 carbon atoms, and $n$ is an integer of from 1 to 2.

2. A compound of the formula

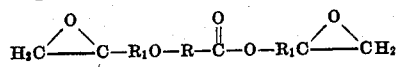

wherein R is chosen from the group consisting of an aliphatic hydrocarbon radical having not more than 18 carbon atoms and an aromatic hydrocarbon radical having not more than 18 carbon atoms, and $R_1$ is an alkylene hydrocarbon radical having not more than 8 carbon atoms.

3. A compound of the formula

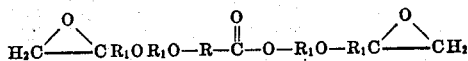

wherein R is chosen from the group consisting of an aliphatic hydrocarbon radical having not more than 18 carbon atoms and an aromatic hydrocarbon radical having not more than 18 carbon atoms, and $R_1$ is an alkylene hydrocarbon radical having not more than 8 carbon atoms.

4. Glycidyl ether of glycidyl 3-hydroxypropionate.
5. Glycidyl ether of glycidyl 10-hydroxystearate.
6. Glycidyl ether of glycidyl 9,10-dihydroxystearate.
7. Epoxypropoxyethyl ether of epoxypropoxyethyl hydroxypropionate.
8. Glycidyl ether of glycidyl citrate.

References Cited in the file of this patent

UNITED STATES PATENTS

| | | |
|---|---|---|
| 2,260,753 | Marple et al. | Oct. 28, 1941 |
| 2,567,842 | Erickson | Sept. 11, 1951 |
| 2,642,412 | Newey et al. | June 16, 1953 |
| 2,801,232 | Suen et al. | July 30, 1957 |

FOREIGN PATENTS

| | | |
|---|---|---|
| 556,038 | Great Britain | Sept. 17, 1943 |

OTHER REFERENCES

Swern: Chemical Reviews, vol. 45, August 1949, pages 16–25.

Webster's New International Dictionary, 2nd edition, unabridged. Merriam (1956), page 862 under "Epoxy."